United States Patent [19]
Murphy et al.

[11] Patent Number: 5,488,686
[45] Date of Patent: Jan. 30, 1996

[54] DATA PROCESSING SYSTEM

[75] Inventors: Alan S. Murphy, Hiltingbury; Patricia Tustin, Locks Heath, both of United Kingdom

[73] Assignee: International Business Machines Corporation, Armonk, N.Y.

[21] Appl. No.: 867,932

[22] Filed: Apr. 13, 1992

[30] Foreign Application Priority Data

Jul. 13, 1991 [GB] United Kingdom ............... 9115142

[51] Int. Cl.$^6$ .................................................. G06F 15/00
[52] U.S. Cl. ................................................... 395/161
[58] Field of Search ........................... 395/153, 154, 395/155, 161; 345/24, 117

[56] References Cited

U.S. PATENT DOCUMENTS

| | | | |
|---|---|---|---|
| 4,068,304 | 1/1978 | Beausoleil et al. | 364/200 |
| 4,087,794 | 5/1978 | Beausoleil et al. | 364/900 |
| 4,635,208 | 1/1987 | Coleby et al. | 364/491 |
| 4,686,522 | 8/1987 | Hernandez et al. | 340/709 |
| 4,815,029 | 3/1989 | Barker et al. | 364/900 |
| 4,821,211 | 4/1989 | Torres | 364/521 |
| 4,843,538 | 6/1989 | Lane et al. | 364/188 |
| 4,853,843 | 8/1989 | Ecklund | 364/200 |
| 4,868,766 | 9/1989 | Oosterholt | 364/522 |
| 4,873,623 | 10/1989 | Lane et al. | 364/188 |
| 4,885,717 | 12/1989 | Beck et al. | 364/900 |
| 4,899,136 | 2/1990 | Beard et al. | 340/706 |
| 4,933,514 | 6/1990 | Bowers | 178/18 |
| 4,939,507 | 7/1990 | Beard et al. | 340/706 |
| 4,945,475 | 7/1990 | Bruffey et al. | 364/200 |
| 4,951,190 | 8/1990 | Lane et al. | 364/188 |
| 4,953,080 | 8/1990 | Dysart et al. | 364/200 |
| 4,984,152 | 1/1991 | Muller | 364/200 |
| 4,989,132 | 1/1991 | Mellender et al. | 364/200 |
| 4,996,654 | 2/1991 | Rosenow | 364/521 |
| 5,001,697 | 3/1991 | Torres | 364/521 |
| 5,040,131 | 8/1991 | Torres | 364/521 |
| 5,041,967 | 8/1991 | Ephrath et al. | 364/200 |
| 5,041,982 | 8/1991 | Rathnam | 364/443 |
| 5,133,052 | 7/1992 | Bier et al. | 395/155 |
| 5,307,456 | 4/1994 | McKay | 395/154 |

*Primary Examiner*—Phu K. Nguyen
*Attorney, Agent, or Firm*—L. Keith Stephens; Mark S. Walker; George E. Clark

[57] ABSTRACT

A data processing system which defines a plurality of logical workspaces for performing tasks in response to operations performed by a system user and provides communication between two or more of the workspaces. When a user in a first workspace selects a screen object ('door') corresponding to a second workspace, visual, audio and data communication are initiated between the first user and the second workspace according to predefined access privileges associated with the first user.

Access privileges are typically predefined by the owner of the workspace.

11 Claims, 7 Drawing Sheets

| USER | ACCESS TYPE | STATE | PASS THRU TO |
|---|---|---|---|
| OWNER | VISUAL ACCESS<br>AUDIO ACCESS<br>INTERRUPT<br>ACCEPT MAIL FROM<br>QUERY<br>CONTROL OF PROFILES | FULL<br>FULL<br>YES<br>YES<br>YES<br>YES | PRIVATE W. S.<br>PRIVATE W. S.<br>PRIVATE W. S.<br>INTRAY<br>-<br>- |

FIG. 7a

| USER | ACCESS TYPE | STATE | PASS THRU TO |
|---|---|---|---|
| ALAN<br>CHARLIE | VISUAL ACCESS<br>AUDIO ACCESS<br>INTERRUPT<br>ACCEPT MAIL FROM<br>QUERY<br>CONTROL OF PROFILES | PEEP<br>FULL<br>YES<br>YES<br>YES<br>NO | PUBLIC W. S.<br>PRIVATE W. S.<br>PRIVATE W. S.<br>INTRAY<br>-<br>- |

FIG. 7b

| USER | ACCESS TYPE | STATE | PASS THRU TO |
|---|---|---|---|
| GARY<br>TRISH | VISUAL ACCESS<br>AUDIO ACCESS<br>INTERRUPT<br>ACCEPT MAIL FROM<br>QUERY<br>CONTROL OF PROFILES | PEEP<br>FULL<br>YES<br>YES<br>YES<br>NO | PUBLIC W. S.<br>PUBLIC W. S.<br>PUBLIC W. S.<br>INTRAY<br>-<br>- |

FIG. 7c

| USER | ACCESS TYPE | STATE | PASS THRU TO |
|---|---|---|---|
| STRANGER | VISUAL ACCESS<br>AUDIO ACCESS<br>INTERRUPT<br>ACCEPT MAIL FROM<br>QUERY<br>CONTROL OF PROFILES | NO<br>FULL<br>YES<br>YES<br>NO<br>NO | -<br>INTRAY<br>INTRAY<br>INTRAY<br>-<br>- |

FIG. 7d

| USER | ACCESS TYPE | STATE | PASS THRU TO |
|---|---|---|---|
| ALL | VISUAL ACCESS | FULL | PUBLIC W. S. |
| | AUDIO ACCESS | FULL | PUBLIC W. S. |
| | INTERRUPT | YES | PUBLIC W. S. |
| | ACCEPT MAIL FROM | YES | PUBLIC W. S. |
| | QUERY | YES | - |
| | CONTROL OF PROFILES | YES | - |

FIG. 8

| USER | ACCESS TYPE | STATE | PASS THRU TO |
|---|---|---|---|
| ALL | VISUAL ACCESS | PEEP | PUBLIC W. S. |
| | AUDIO ACCESS | HEAR | PUBLIC W. S. |
| | INTERRUPT | NO | - |
| | ACCEPT MAIL FROM | NO | - |
| | QUERY | NO | - |
| | CONTROL OF PROFILES | NO | - |

FIG. 9

0
DATA PROCESSING SYSTEM

FIELD OF THE INVENTION

The present invention relates to data processing systems, and in particular to communication between users and workspaces in computer workstations.

BACKGROUND OF THE INVENTION

It is known for self-contained computer workstations to be interconnected by a digital network. One advantage of such a network is that users of individual workstations can communicate with one another over the network, for example by means of a typed note, a data file or a program file transmitted to another user.

An important feature of systems providing user communication between workstations is that they should be 'user-friendly'. In other words, it is desirable that the system should be able to be operated by a user who is not a skilled computer programmer.

The problem of inter-user communication is very similar to the problem of a single user maintaining communication between a number of concurrently running data processing tasks.

One approach at providing user-friendly interaction between different tasks running on a single workstation has been described by Henderson and Card in the article 'Rooms: The Use of Multiple Workspaces to Reduce Space Contentions in a Window-Based Graphical User Interface' (ACM Transactions on Graphics, Vol.5, No.3, Jul. 1986, pages 211–243). This article describes a system in which a plurality of virtual workspaces, or 'rooms' are defined in each of which a different task may be performed.

This prior art system makes use of the concept of a 'door'. A door in this context is basically an icon which can be selected and which causes the workspace to be changed. When the user wishes to change room, he might well want to take some of the items being processed from one room to another. The article refers to these items as 'baggage'. Despite the many advantages of the concept of 'rooms', the selection and transfer of baggage from one room to another can be rather cumbersome and time consuming processes.

As network capacities increase and better data compression techniques are developed, it is becoming more feasible to use the links provided by a computer network to transmit real-time sound or vision information between users and workspaces, which may well be running on other workstations. This has the potential for providing a more user-friendly means of communication between the workstation operators.

European Patent Application number 90300885.2 (UK9-89-041) describes a system in which a plurality of virtual data screens or rooms are defined. Distinct-anterior and posterior display layers are provided, with the anterior layer having a background such that the content of the posterior layer can be viewed therethrough. One of the layers is assignable for the display of a selected virtual screen, the other layer being dedicated to the display of an additional virtual screen. The system provides for the transfer of objects between the anterior and posterior display layers such that the dedicated layer can be used for transporting objects between workspaces. A facility is also described whereby one user can set up a shared vision channel with another user by selecting a door icon corresponding to that other user.

The workspaces can correspond to a single user or be shared 'meeting workspaces'. In addition, a user can have a 'private' workspace with more restricted access than his 'public' workspace.

The 'Timbuktu/Remote' software product, produced by Farallon Computing Incorporated for use on the Apple Macintosh computer, provides an on-screen 'button' mechanism for accessing different workspace environments. The user can select (for example by means of a mouse-driven pointer or cursor) one of three buttons, which initiate varying degrees of access to another workspace. In particular, the three buttons are labelled 'ATTENTION', 'OBSERVE', and 'CONTROL', respectively providing means for gaining the attention of the other user, means for observing the other workspace, and means for controlling the other workspace.

SUMMARY OF THE INVENTION

According to the present invention there is provided a data processing system which defines a plurality of logical workspaces for performing tasks in response to operations performed by a system user and provides communication between two or more of the workspaces, characterized in that selection by a first user in a first workspace of a screen object corresponding to a second workspace initiates visual, audio and data communication between the first user and the second workspace according to predefined access privileges associated with the first user.

The invention both recognizes and solves the problem of handling voice, vision and data communication between workstations in a unified and consistent manner.

The door metaphor is extended from that used in the prior art to provide a single means whereby full audio, visual and data communication is initiated between a user and a workspace. The workspace may be running on the user's workstation or on another workstation linked to the user's by an electronic network.

Preferably the access privileges are also associated with the second workspace, in that a particular user may have different access privileges for different workspaces. It is preferred that the access privileges corresponding to the second workspace are predefined by a user responsible for that workspace (the 'owner' of the workspace).

In a preferred embodiment each workspace has an associated agent means (preferably a computer program) for controlling access to that workspace, the agent means including: means for maintaining a privilege table defining the access to the workspace allowed for one or more users; means for determining the identity of a user requesting access to the workspace; and means, associated with the privilege table, for granting and supervising access to the workspace according to the access allowed for that user.

Although the invention is applicable to communication between a user of a single workstation and a workspace running on that workstation, it is preferred that the data processing system comprises a plurality of data processing workstations interconnected by a data network, in which a user of a first workstation can initiate communication with a workspace running on a second workstation.

BRIEF DESCRIPTION OF THE DRAWINGS

In order that the invention may be fully understood a preferred embodiment thereof will now be described, by way of example only, with reference to the accompanying drawings in which:

FIGS. 7a to 7d show sample profiles for users with various levels of access privilege;

FIG. 8 shows an access profile for a meeting workspace;

FIG. 9 shows an access profile for a workspace dedicated for use in broadcasting information to a number of users.

DETAILED DESCRIPTION OF THE INVENTION

Figure 1:
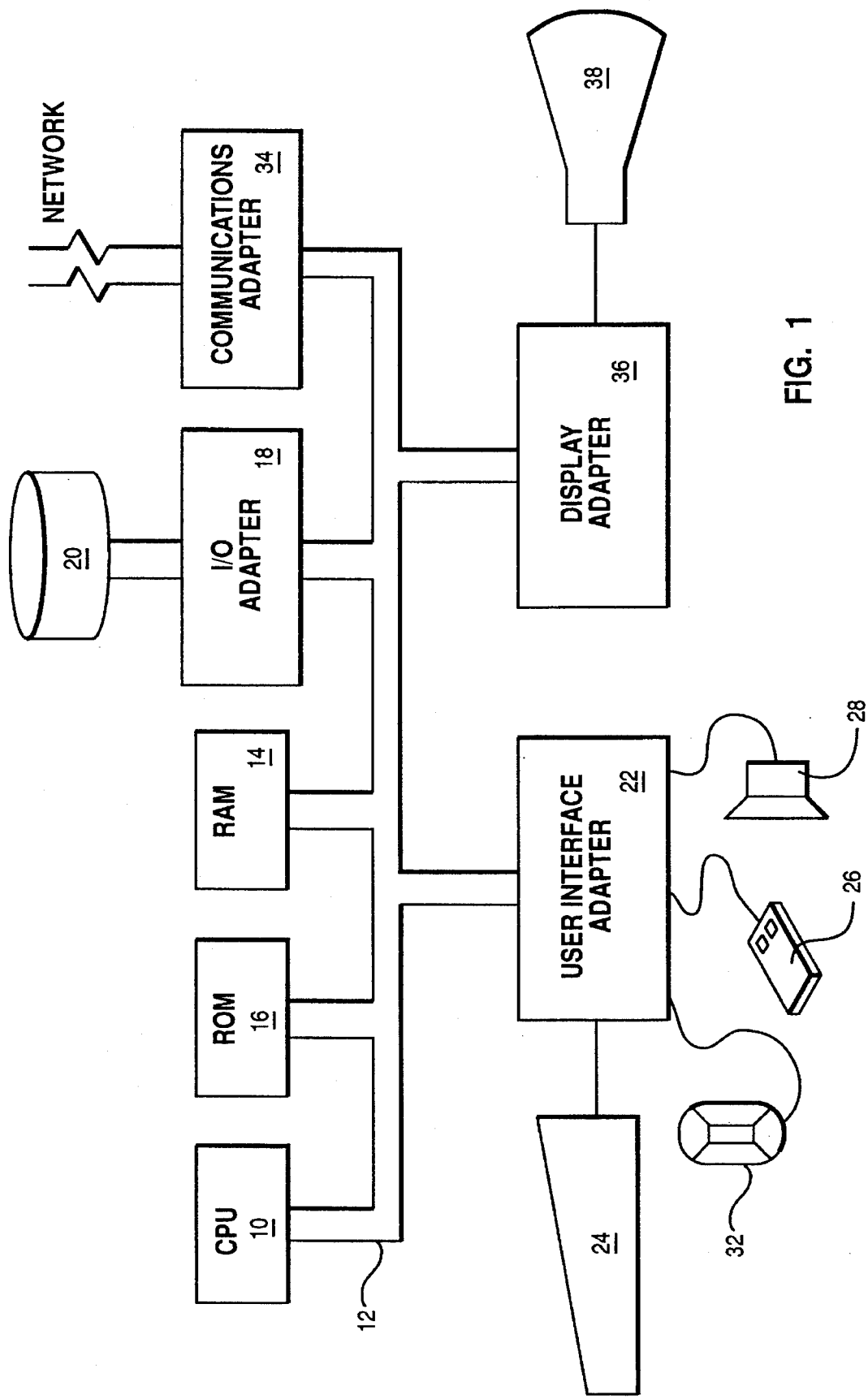
FIG. 1 is a block diagram showing the configuration a typical workstation.

Refer now to FIG. 1, which illustrates a typical hardware configuration of a workstation with a central processing unit 10, such as a conventional microprocessor, and a number of other units interconnected via a system bus 12. The workstation shown in FIG. 1 includes a random access memory (RAM) 14, read only memory (ROM) 16, an I/O adapter 18 for connecting peripheral devices such as disk units 20 to the bus, a user interface adapter 22 for connecting a keyboard 24, a mouse 26, a loudspeaker 28, a microphone 32, and/or other user interface devices such as a touch screen device (not shown) to the bus, a communications adapter 34 for connecting the workstation to a data processing network and a display adapter 36 for connecting the bus to a display device 38.

Although FIG. 1 shows a typical 'intelligent' workstation, a workstation may in fact be a dumb terminal with only a limited processing capability, under the control of a host processor. This will be made clear in connection with FIG. 2.

Figure 2:
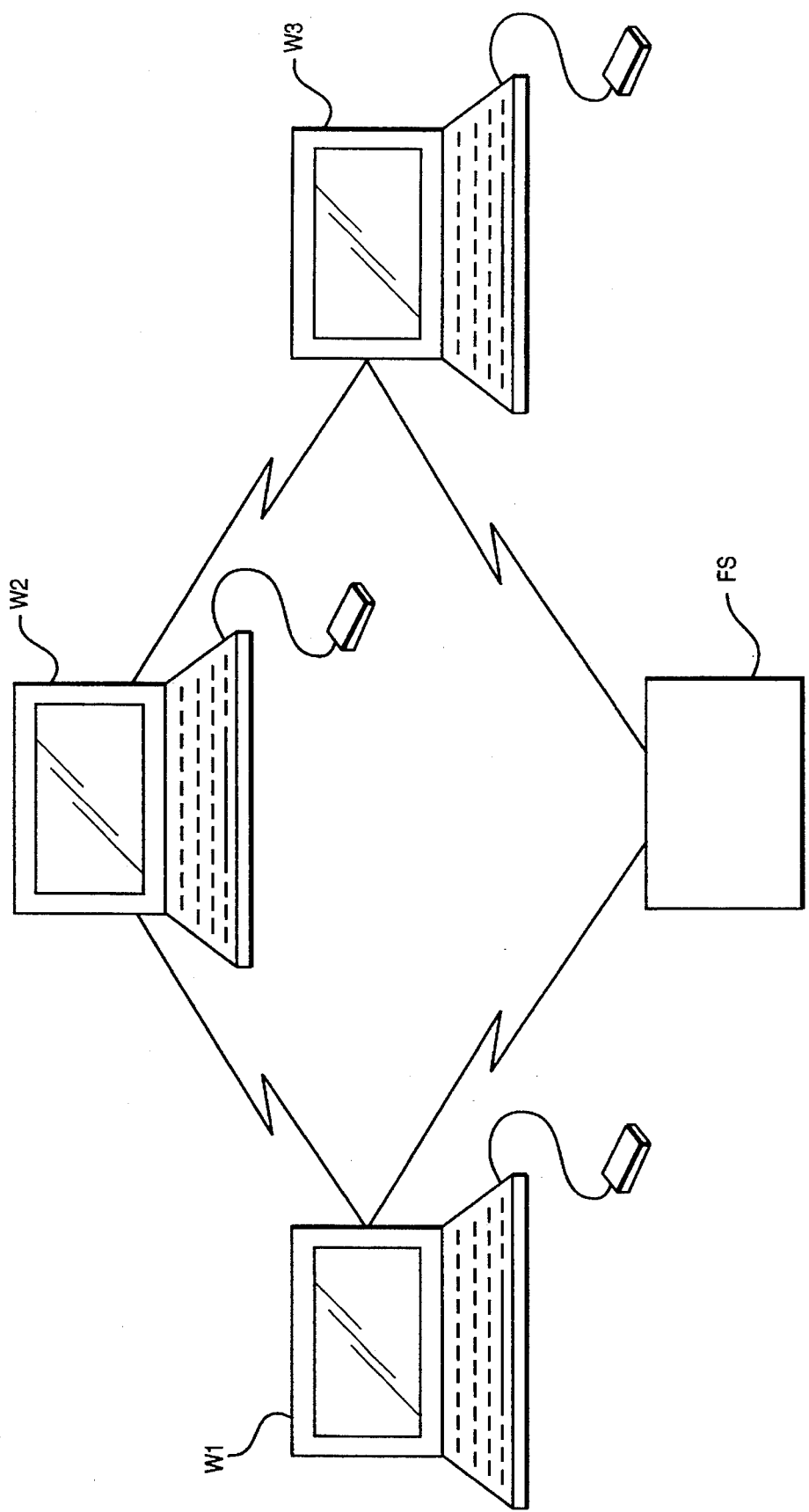
FIG. 2 is a schematic diagram of a data processing system comprising three workstations and a file server.

FIG. 2 illustrates a data processing system comprising a number of workstations (here, three workstations W1, W2 and W3) interconnected via a data network so as to permit communication between the workstations. It is assumed that the data processing system shown in FIG. 2 is of a type which will permit concurrent real time communication between the users. In FIG. 2 the workstations are connected as part of a local area network under the control of a File Server (FS). The network operates according to a conventional network protocol, such as the token ring protocol.

FIG. 2 shows just one possible hardware configuration for a data processing network. Other configurations are possible. For example, the data processing system could be based upon a star network, or based upon a host processor connected to a plurality of dumb terminals, or based upon a plurality of remote processors connected by a communications network. The network could also be based upon the telephone network, an ISDN network or any other 'dial up' network. The workstations could be located within a single workspace, or within a local area (eg in a building), or could be remote from one another.

Figure 3:
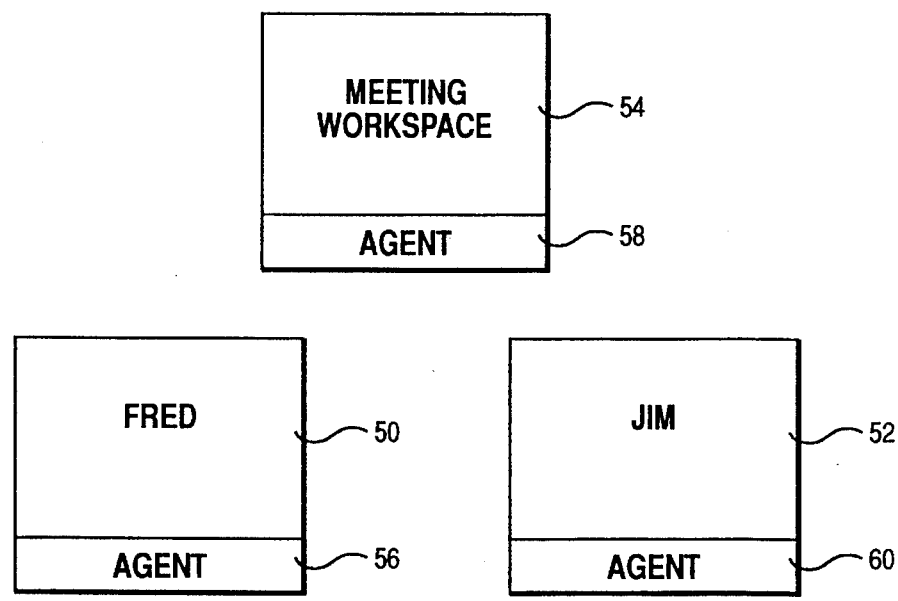
FIG. 3 is a schematic representation of three workspaces.

Referring now to FIG. 3, three workspaces or rooms 50, 52, 54 are shown in schematic form. The three rooms are labelled 'Fred' 50, 'Jim' 52, and 'Meeting Room' 54. Rooms 50 and 52 are associated with individual users, but are public in the sense that other users can access those rooms with permission from the respective owners. Room 54 is a shared workspace which can be entered by a number of users at a single time in order to discuss and operate on shared data.

In the context of the present description, visual communication between a user and a workspace concerns the ability of that user to see on his display screen objects displayed in that workspace. In addition, full visual communication allows the user to manipulate those objects using tools and utilities in the workspace itself. A typical application might be that of a first user having full visual access to a second user's workspace. In this case, the two users would both be able to see, manipulate, and operate upon screen objects displayed in the workspace. This principle, 'what you see is what I see', or 'WYSIWIS', has been described in an article by Stefik et al, entitled 'Beyond the Chalkboard: Computer Support for Collaboration and Problem Solving in Meetings', Communications of the ACM 30, pages 32 to 47.

Access to each workspace is under control of a respective 'agent' computer program 56, 58, 60. Alternatively, a single agent may control more than one workspace i.e. he may control his own personal workspace and a public meeting room. The agent maintains lists of which users are allowed access and what those users are privileged to do in the workspace. When a request for access to a workspace is made, the agent controls the grant of that access and supervises communication between the user and the workspace. The agent may also pass or forward the request to another workspace agent which can deal with it more effectively. This may be used when an owner is away from his current workspace, but needs to be contacted immediately. In this situation the agent could transfer a request onto the agent dealing with a meeting room or if the owner is currently a visitor in another person's workspace, then the agent could pass the request onto that person's workspace agent.

Instead of providing access to a selected workspace, a door could be arranged to provide access to a number of other doors (a 'corridor').

Figure 4:
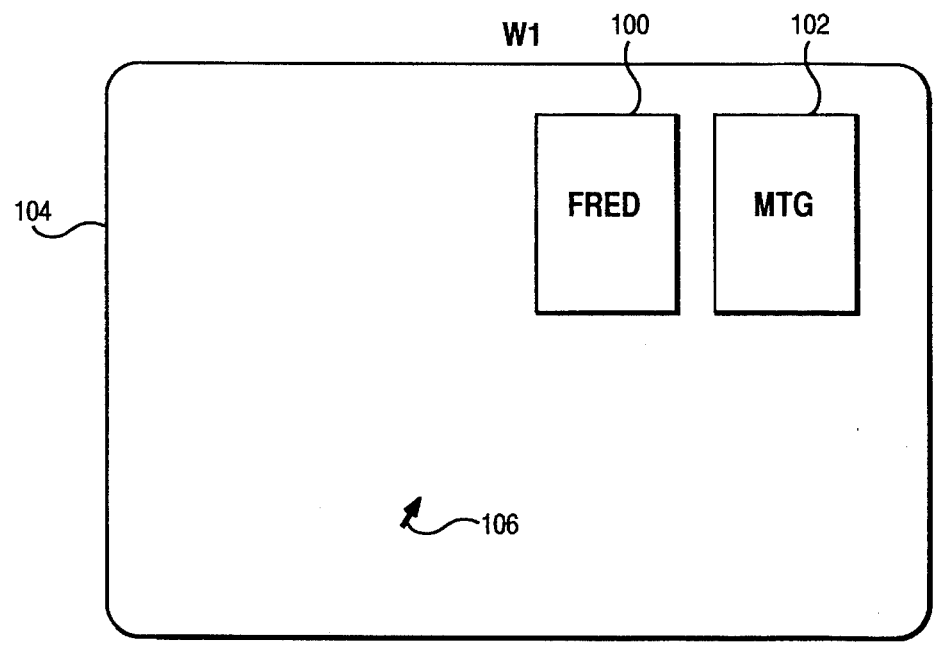
FIG. 4 shows the display screen of workstation W1.

FIG. 4 illustrates information displayed on the display device 38 of one of the workstations W1. In FIG. 4 two 'doors' 100, 102 are shown on the screen 104 of the display device.

The basic idea of a door has been described in 'Rooms: The Use of Multiple Workspaces to Reduce Space Contentions in a Window-Based Graphical User Interface' (ACM Transactions on Graphics, Vol.5, No.3, July 1986, pages 211–243), and in European Patent Application number 90300885.2.

The doors 100, 102 shown in FIG. 4 are labelled 'Fred' and 'MTG' respectively, and can be used by the operator of workstation W1 (Jim) to initiate communication with Fred's workspace or the meeting workspace.

In operation, one of the doors 100, 102 is selected by Jim, by for example positioning a mouse-driven cursor 106 over the door and operating a mouse control button. Alternatively, if a touch screen is used, Jim may simply touch the part of the screen 104 corresponding to the door. The single user interface represented by the door allows Jim to perform one or more of the following:

a) to interrupt Fred or the occupiers of the meeting workspace to attract attention;

b) to establish an audio channel for communication to or with the selected workspace;

c) to establish a vision channel for communication to or with the selected workspace; and d) to transmit data or program files to the selected workspace.

Thus a single door can be arranged to provide a number of general services associated with establishing environments for cooperative working between two or more users.

Figure 5:
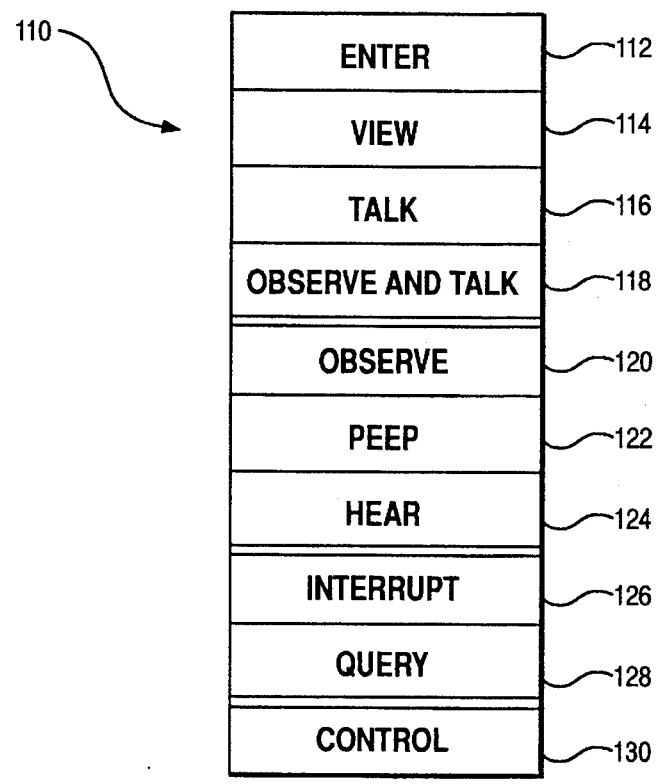
FIG. 5 shows the menu presented to a user when a door is selected.

When a door (say, door 100 corresponding to user 'Fred') is selected, the user of W1 ('Jim') is presented with a multiple choice menu. An example 110 of such a menu is shown in FIG. 5.

This shows a full set of menu items. Any particular user may not be allowed to exercise all the choices shown. Usually choices which are currently not allowed would either be grayed-out or not presented on the menu. Normally one of the menu choices, usually 'Enter', would be treated as the default and activated by, for example, a mouse 'double click'. The exact mechanism for this would be determined by the user interface style employed.

Using for example a mouse driven cursor or a touch screen, the user can select one of the options 112–130 shown on menu 110. These are:

112 Enter: This command initiates full, two way, audio and visual communication with Fred;

114 View: This command provides two way visual communication with Fred;

116 Talk: This command initiates two way audio communication with Fred;

118 Observe and Talk: This command allows the user to 'Observe' (see below) and also to talk with Fred (see above).

120 Observe: This command initiates 'read only' audio and visual communication with Fred. Jim can see and listen to events happening in Fred's environment. He cannot create an event or speak to Fred;

122 Peep: This command is similar to 'observe', but only allows visual access to the selected workspace. One application of this facility would be to access bulletin board notices;

124 Hear: Again, this is similar to 'observe', but only allows audio access to Fred's environment. This could be used if Jim wished to keep a listening watch on a meeting while he continues to work in his own environment;

126 Interrupt: Jim is able to create an attention interrupt in Fred's environment. This would cause a message (either visual or audio or both) to be emitted in the environment, such as:

'Jim would like to interrupt you . . .'

128 Query: This initiates a dialogue with the agent controlling Fred's environment. For example, Jim may wish to find out who is working in the environment without disturbing it, or make an enquiry about the machine resources being used there;

130 Control: This allows the 'owner' of the door to control various attributes of the door, such as whether particular users can enter or observe the workspace corresponding to that door. The control option can also be used in real time, for example to expel a user from the workspace or to prevent further access for a period of time (to 'lock' the door). The control option will be described in more detail below, with reference to FIGS. 7a to 7d.

Figure 6:
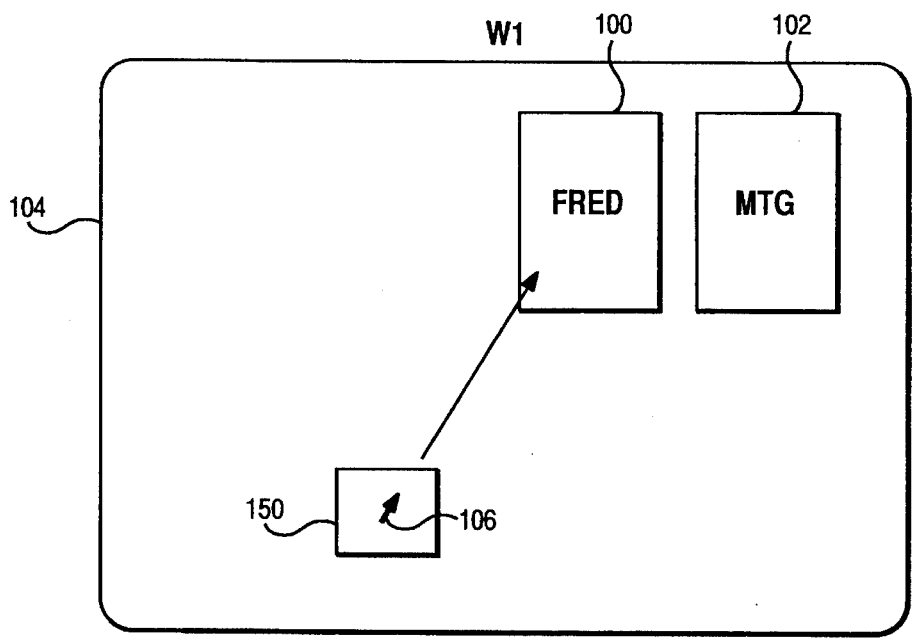
FIG. 6 shows how the user can mail a data object to another workspace.

FIG. 6 illustrates how one user can transmit, or 'mail' a data object 150 such as a data or program file to another workspace. The user simply positions a mouse driven cursor 106 over the object and 'drags' the object to the door (that is, he holds down a mouse button while moving the cursor over the required door). When the user releases the button, the data object is mailed to the workspace corresponding to that door. This is, of course, subject to the user having privilege to send data objects to that workspace.

FIGS. 7a to 7d show the access options which can be set by the owner of a window when the 'control' command 130 is selected. The access options vary between complete access for the owner, down to very limited access to the workspace for a complete stranger.

FIG. 7a shows a profile defining the access which the owner of the door has allowed himself. The owner's profile gives him full access to his public workspace and allows him to pass directly through to his private workspace. He is also able to control and edit the profiles defining other users' access to his rooms.

FIG. 7b shows a list of users who are allowed to peep at the owner;s public workspace (that is, they cannot interact visually with it). They are allowed direct audio access to the owner's private workspace and in this case the agent associated with the public workspaces passes the request onto the agent which is associated with the private workspace. This allows certain communications to be forwarded to users who are not currently working in their public workspace.

Removal of the name of a user would prevent that user entering the workspace. If he were present at the time his name was removed, he would be expelled immediately.

FIG. 7c shows a set of users who are not allowed to progress beyond the owner's public workspace. They are allowed restricted (peep only) visual access to the public workspace.

Finally, FIG. 7d shows the very restricted access given to any user whose name does not appear on any of the other profiles (that is, a stranger). In this example, such users are not allowed visual access at all, and any communication from them including an interrupt request is placed in an 'in-tray' for the owner to examine later.

FIG. 8 shows a typical profile for a meeting workspace. All users are allowed full access to the workspace, including control of profiles.

FIG. 9 illustrates a profile for a workspace which is dedicated for use in broadcasting information to other users. Any user can have 'read only' audio and visual access to the workspace. They cannot control the workspace profiles. This workspace will not accept Mail from users; any attempt to do so will cause the mail to be rejected from the workspace and returned to the sender.

The system can be arranged so that the menu options 110 given to the user when he selects a door depend on the access privilege which the user has to the workspace corresponding to that door. For example, the full menu as illustrated in FIG. 5 would be given to a user such as Alan or Charlie (FIG. 7a), whereas a menu comprising only the options 'talk', 'hear', and 'interrupt' would be presented to a stranger selecting the workspace.

When a user selects a door corresponding to a particular workspace, the agent controlling access to that workspace performs a number of steps. These steps are shown schematically as a flowchart in FIG. 10.

Figure 10:
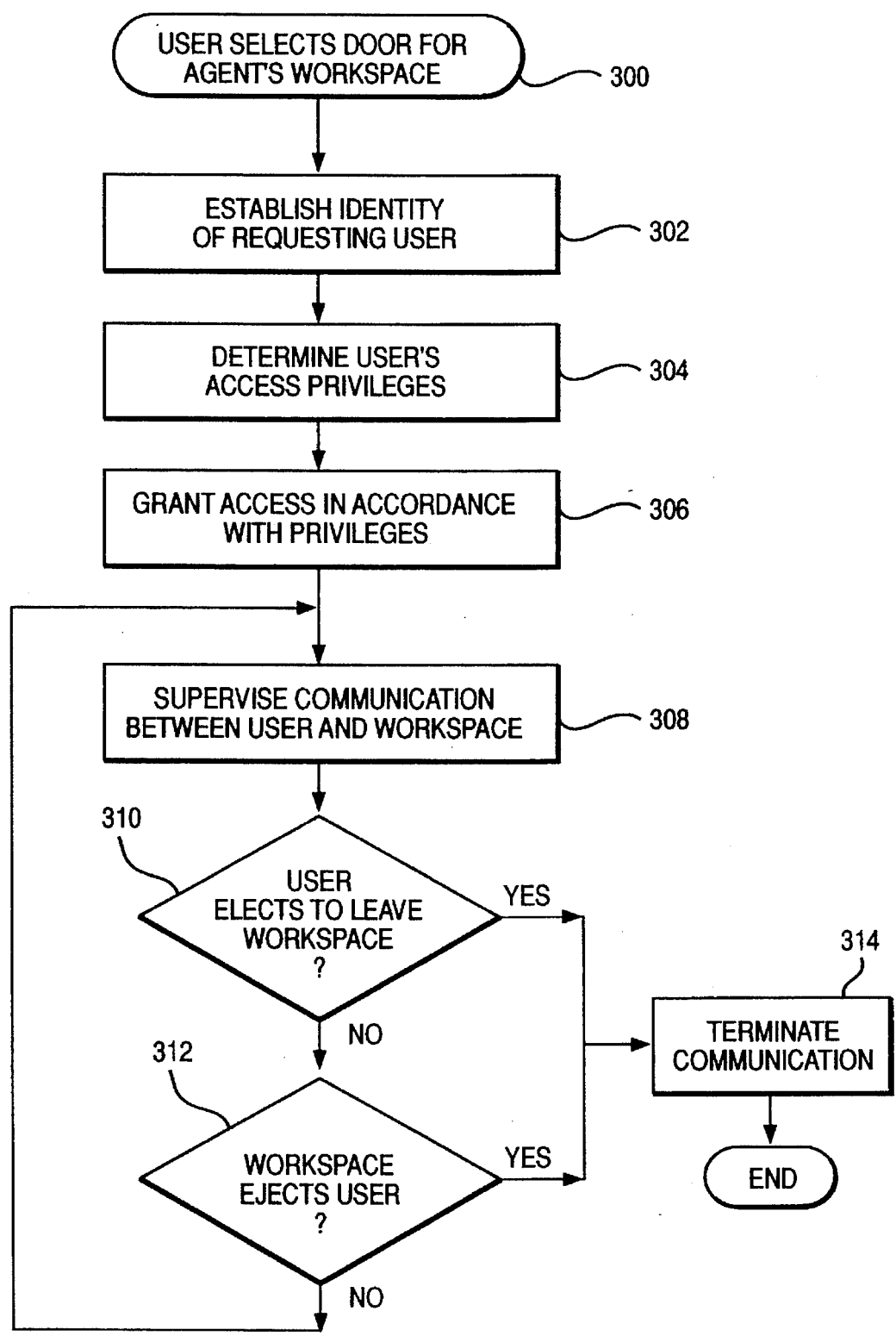
FIG. 10 shows a flow chart of the steps performed by the agent program controlling access to a workspace.

The flowchart in FIG. 10 starts 300 with the user selecting a door controlled by the agent. At step 302 the agent establishes the identity of the user. This can be by requesting the user to input a secret password identifier or a non-secret user identifier, or simply by polling the user's workstation. At step 304 the agent checks the user's identity against the access privilege profiles for the workspace (such as those shown in FIGS. 7a to 7d) and determines the level of access privilege to be assigned to that user. In the present embodiment the access profiles include a default 'stranger' profile allowing very restricted access to anyone not specifically named in one of the other profiles.

In step 306 the agent then grants access for the user in accordance with the privileges determined in step 304. The agent then supervises communication between the user and the workspace (step 308) until the user leaves the workspace (step 310) or the owner of the workspace ejects the user from the workspace (step 312). In either of these cases communication is stopped at step 314.

This example is easily extended to cater for door requests which have some priority attached. A note posted onto a door might have a 'priority label' attached by the sender (Priority=99, or URGENT). This label would be inspected by the door agent and, according to predefined profile tables a different action might be taken: urgent notes might be presented immediately in the workspace, rather than by being filed in an Intray. A user making a request for a workspace interrupt would be queried to determine the priority of the interrupt. Only urgent or high priority interrupts would be allowed. Lower priority interrupts would either be rejected or placed in a pending state according to previously specified profile tables.

While the invention has been described in terms of a preferred embodiment in a specific system environment, those skilled in the art recognize that the invention can be practiced, with modification, in other and different hardware and software environments within the spirit and scope of the appended claims.

Having thus described our invention, what we claim as new, and desire to secure by Letters Patent is:

1. A data processing system with a plurality of workspaces for performing one or more tasks in response to user inputs, comprising:
   (a) means for enabling communication between the plurality of workspaces;
   (b) a screen object associated with each of said plurality of workspaces;
   (c) a data structure for storing a list of user profile information for each user; and
   (d) means for selecting a screen object by a user in a first of the plurality of workspaces, the screen object corresponding to a second of the plurality of workspaces, and initiating visual, audio or data communication between the user and the second workspace according to the user profile information stored in the data structure.

2. A data processing system as recited in claim 1, in which the user profile information comprises access privileges.

3. A data processing system as recited in claim 1, in which the data structure is accessed to determine the access privileges of a particular user.

4. A data processing system as recited in claim 1, including means associated with the data structure for determining the priority of a communication and granting and supervising access in accordance with the priority.

5. A data processing system as recited in claim 1, wherein the workspaces reside on a plurality of data processing workstations and the means for enabling communication is a network.

6. A method for initiating one or more tasks in a data processing system with a plurality of workspaces, a data structure, and a plurality of screen objects representing each of said plurality of workspaces, comprising the steps of:
   (a) enabling communication between the plurality of workspaces;
   (b) storing a list of user profile information for each user in the data structure; and
   (c) selecting one of the plurality of screen objects by a user in a first workspace, and initiating visual, audio or data communication between the user and the workspace represented by the selected screen object according to the user profile information stored in the data structure.

7. A method as recited in claim 6, including the additional step of defining default access privileges in the data structure.

8. A method as recited in claim 6, including the step of accessing the data structure to determine the access privileges of a particular user.

9. A method as recited in claim 6, including the step of determining the priority of a communication, granting and supervising access in accordance with the priority.

10. A method as recited in claim 6, wherein the workspaces reside on a plurality of data processing workstations interconnected by the network.

11. A control element for directing the operation of a computer, having storage means for retaining signals recognizable by the computer and controlling the operation thereof, the signals comprising:
   (a) means for use with the computer to enable communication between a plurality of workspaces;
   (b) means for use with the computer to store a list of user profile information for each user in a data structure; and
   (c) means for use with the computer to select a screen object by a user in a first of said plurality of workspaces, the screen object corresponding to a second of said plurality of workspaces, and initiate visual, audio or data communication between the user and the second workspace according to the user profile information stored in the data structure.

* * * * *